United States Patent [19]

Sawyer

[11] 4,335,338

[45] Jun. 15, 1982

[54] LINEAR MOTOR

[75] Inventor: Bruce A. Sawyer, Santa Rosa, Calif.

[73] Assignee: Xynetics, Inc., Santa Clara, Calif.

[21] Appl. No.: 164,827

[22] Filed: Jun. 30, 1980

[51] Int. Cl.³ .............................................. B64C 13/18
[52] U.S. Cl. ...................................... 318/135; 310/12
[58] Field of Search ..................... 318/38, 135; 310/12, 310/13, 14

[56] References Cited

U.S. PATENT DOCUMENTS

| Re. 27,436 | 7/1972 | Sawyer | 318/38 X |
|---|---|---|---|
| 3,265,911 | 8/1966 | Madsen | 310/12 |
| 3,456,136 | 7/1969 | Pierro | 310/12 |
| 4,281,263 | 7/1981 | Virolleau et al. | 318/135 X |

Primary Examiner—B. Dobeck
Attorney, Agent, or Firm—Ellsworth R. Roston; Charles H. Schwartz

[57] ABSTRACT

A linear motor includes a stator and a head. The stator includes laminations disposed axially to provide for magnetizable properties in alternate laminations and non-magnetizable properties in the other laminations. The magnetizable laminations provide for an axial flow of magnetic flux in certain embodiments and for a radial flow of magnetic flux in other embodiments. Magnetizable means are disposed within the laminations to provide for a flow of the magnetic flux.

37 Claims, 17 Drawing Figures

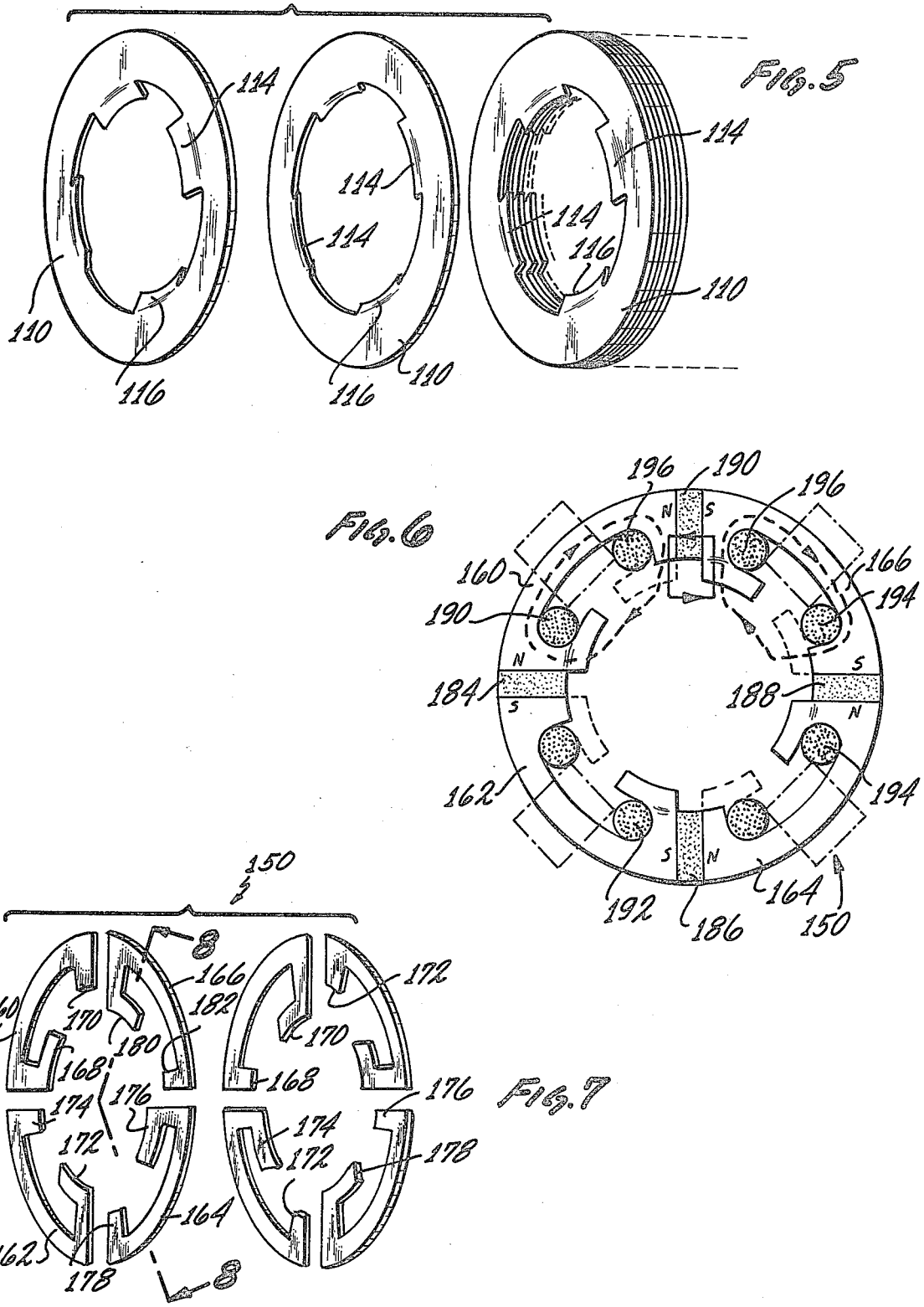

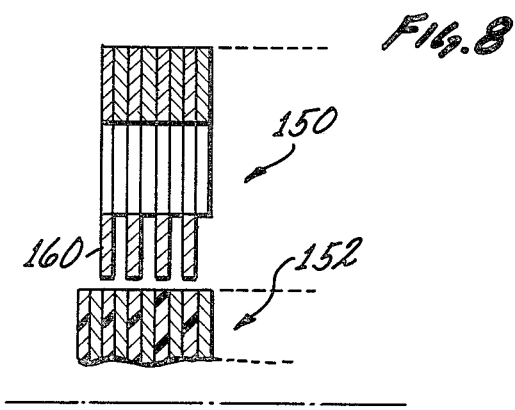
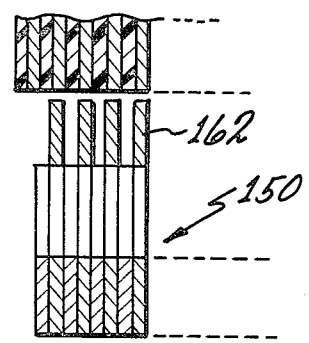
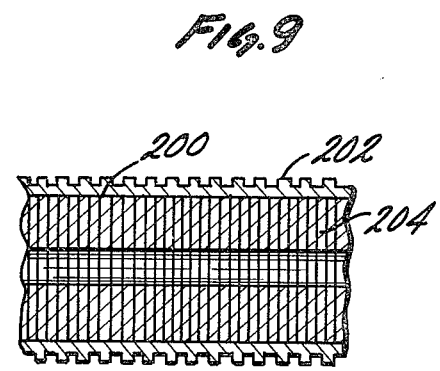
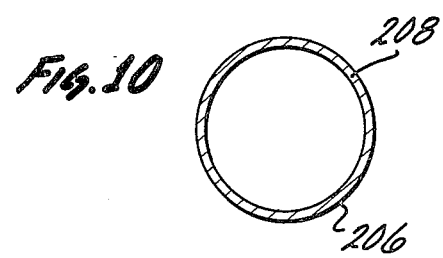
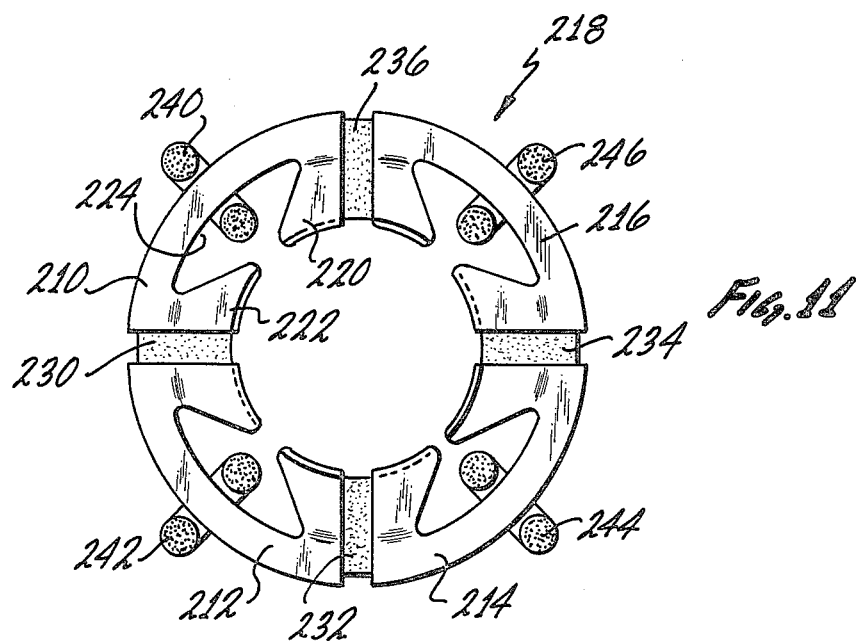

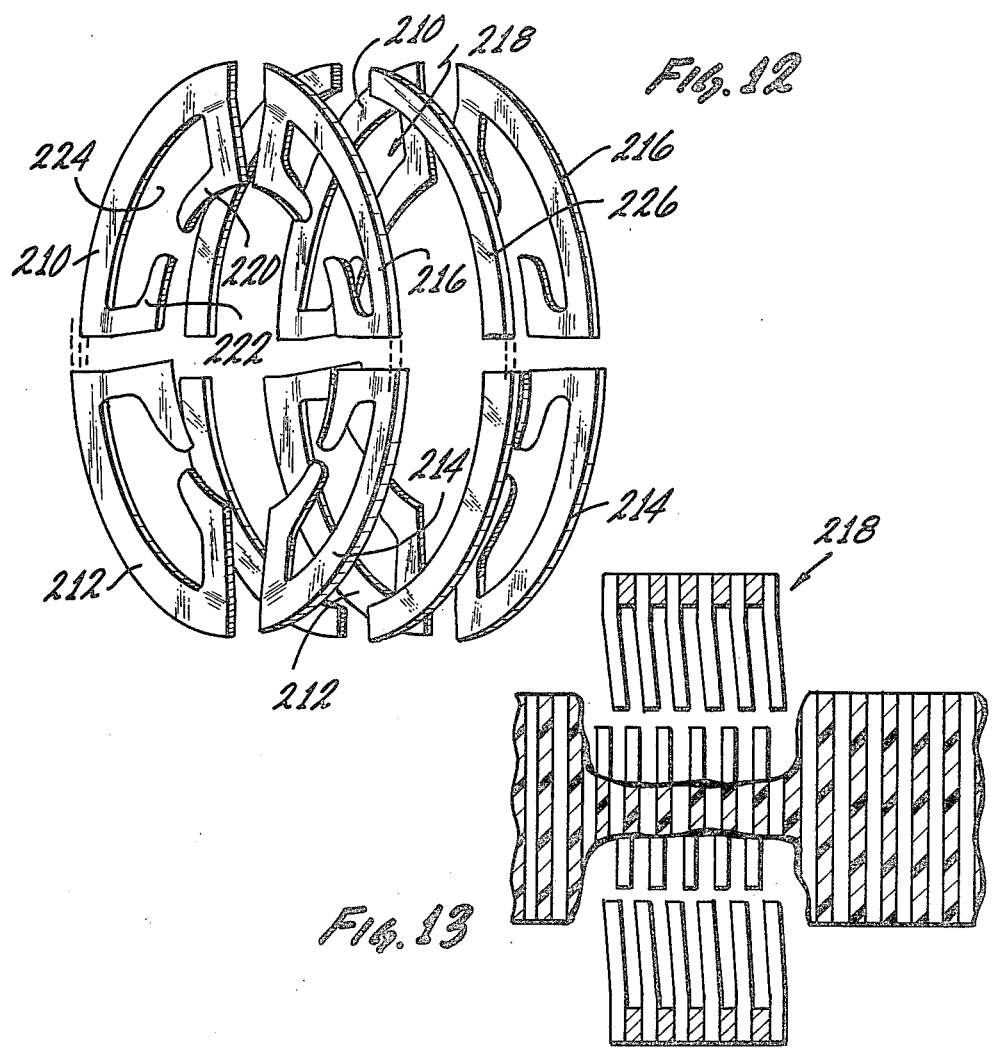

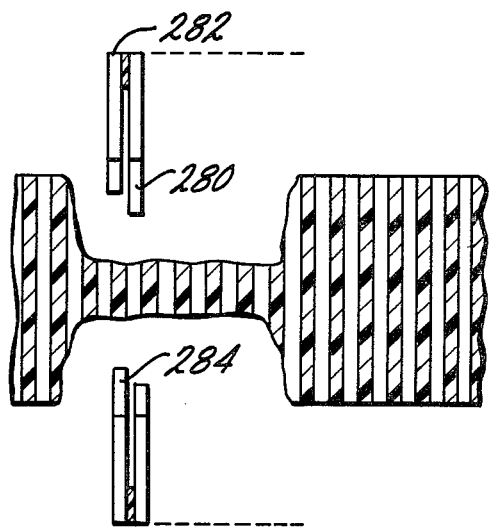
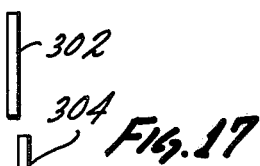
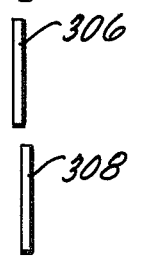
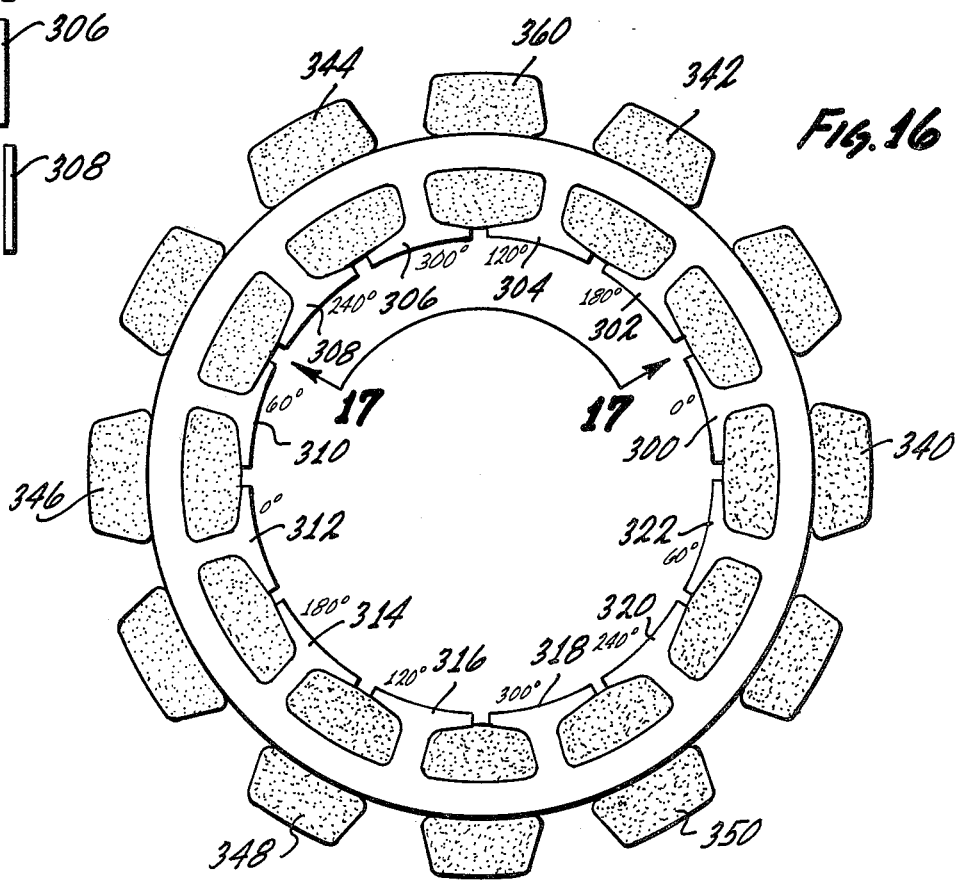

LINEAR MOTOR

This invention relates to linear motors and more particularly relates to linear motors which provide fast and accurate displacements of a movable member relative to a stationary member in accordance with the introduction of command signals and which minimize noise and provide balanced forces during such displacements.

Linear motors have been developed and are being manufactured and marketed for providing a displacement of a movable member such as a head relative to a stationary member such as a stator. The linear motors provide precise displacements at very high speeds in accordance with the frequencies and phases of alternating signals introduced to the motors. Output members such as a scribe or a cutter are movable with the head to provide an output function in accordance with the instructions represented by the alternating signals. Such a linear motor is disclosed and claimed in my U.S. Pat. No. Re. 27,289 assigned of record to the assignee of record of this application.

Until now, the stators have been planar and the heads have been disposed in contiguous relationship to the stator for movement along either a single linear axis or a pair of coordinate axes, both of which are linear. Although such motors have been quite satisfactory for most purposes, the motors have been sometimes considered to offer certain disadvantages. For example, the motors have been noisy because of their high accelerations and decelerations and high speeds. Furthermore, the planar disposition of the head and the stator has inhibited the motor from being balanced. The motor has also been relatively large in size and relatively expensive to manufacture. Various attempts have been made to provide a linear motor which will overcome these disadvantages but such attempts have not been successful.

This invention provides a linear motor which overcomes the above difficulties. The linear motor is self-balancing because the head is symmetrical relative to the stator. This has caused all of the normal forces on the motor to be directed toward a central position and substantially all of the forces to be cancelled. The linear motor is also relatively quiet because the head is disposed in enveloping and symmetrical relationship to the platen. The motor is relatively small in size and relatively inexpensive to manufacture.

The embodiments of this invention include a movable member such as a head and a stationary member such as a stator. The stator includes laminations disposed axially to provide for magnetizable properties in alternate laminations and nonmagnetizable properties in the other laminations. In some embodiments, the magnetizable laminations provide for a radial flow of magnetic flux. In other embodiments, the magnetizable laminations provide for an axial passage of the magnetic flux.

The heads may include first and second assemblies movable relative to the stator. Each assembly may include a permanent magnet or an electromagnet. In one embodiment, such permanent magnet or electromagnet may be shared with the other assembly. Each assembly may also include at least one winding disposed to produce magnetic flux. Each assembly may further include first and second magnetizable portions disposed in axially spaced relationship and in magnetizable relationship to the magnetizable means on the stator. The magnetizable portions on the head are responsive to the flux from the permanent magnet and the flux produced by the winding. Such flux produced by the winding reinforces, in one of the magnetizable portions, the magnetic flux from the permanent magnet and opposes, in the other magnetizable portion, the magnetizable flux from the permanent magnet.

The first and second magnetizable portions in each assembly are disposed in a first phase relationship to each other and in a second phase relationship to the magnetizable portions in the other assembly. Alternating signals are applied to the winding in each assembly. The alternating signals applied to the winding in each assembly have the second phase relationship to the signals applied to the winding in the other assembly.

In a first embodiment, the first and second magnetizable portions in each assembly on the head may be ring-shaped and the winding in each assembly may be ring-shaped and may be disposed axially between the first and second magnetizable portions. A permanent magnet may be disposed between the two assemblies. A sleeve made from magnetizable material may also be provided in each assembly to receive the first and second magnetizable portions and the winding for that assembly.

In a second embodiment, the first and second magnetizable portions in each magnetic assembly on the head are also ring-shaped. The rings are provided with poles inwardly formed to be magnetically coupled to the stator. In first alternate rings in each magnetic assembly, the poles of one pair are shortened to minimize magnetic coupling to the stator. In the other rings in the assembly, the poles of another pair are shortened to minimize magnetic coupling to the stator. As in the first embodiment, the magnetizable portions of each assembly are displaced axially from the magnetizable portion in the other assembly. Furthermore, as in the first embodiment, the flux produced by the magnetic assemblies in the head has a path at least partially in an axial direction.

In a third embodiment, the first and second magnetizable portions in each assembly may be formed from laminations each having at least a pair of angularly spaced poles. In this embodiment, the laminations may be radially and axially spaced from one another. Permanent magnets may be provided between the poles. Windings may be disposed to produce flux extending radially through the poles into the laminations in the stator.

In a fourth embodiment, the first and second magnetizable portions for each assembly may be formed from laminations defining at least a pair of angularly spaced poles. The laminations in each assembly may be spaced angularly from the laminations in the other assembly but may be axially aligned with the laminations in the other assembly. The poles in each assembly are displaced axially from each other by the first phase and may be displaced axially from the poles of the other assembly by the second phase. Permanent magnets may be provided between the poles of adjacent laminations. Windings may be disposed to produce flux extending radially into the laminations in the stator.

The four embodiments described above have two magnetic assemblies with poles which are provided with phases mechanically offset from each other by 90°. The magnetic assemblies also have windings which receive signals displaced electrically by 90°. A fifth embodiment is also included to show that more than two magnetic assemblies may be provided and that the plurality of assemblies may be offset by different phases than 90°. For example, three magnetic assemblies may be provided, each displaced by 120°. Windings may also receive signals displaced electrically by 120°.

It will be appreciated that the radial position of the stator and the head can be reversed. For example, in all of the different embodiments, the head is shown as being radially exterior to the stator. However, the head can actually be disposed radially interior to the stator. It will also be appreciated that the motor can be provided with any particular number of phases equal to or greater than two.

In the drawings:

FIG. 3 is a schematic view illustrating a modification of the linear motor shown in FIGS. 1 and 2;

FIG. 5 is an exploded perspective view of certain of the laminations included in the embodiment shown in FIG. 4;

FIG. 6 is an end view illustrating laminations, windings and magnets in a third embodiment of the invention;

FIG. 7 is an exploded perspective view of certain of the laminations included in the embodiment shown in FIG. 6;

FIG. 8 is an enlarged fragmentary sectional view schematically illustrating the disposition of different laminations in the head relative to individual laminations in the stator in the embodiment shown in FIGS. 6 and 7;

FIG. 9 illustrates a modification in the stator included in the embodiment of FIGS. 6, 7 and 8;

FIG. 10 illustrates another modification in the stator included in the embodiment of FIGS. 6, 7 and 8.

FIG. 11 is an end view illustrating laminations, windings and magnets in a fourth embodiment of the invention;

FIG. 12 is an exploded perspective view of certain of the laminations included in the embodiment shown in FIG. 11;

FIG. 13 is an enlarged fragmentary sectional view schematically illustrating the disposition of different laminations in the head relative to individual laminations in the stator in the embodiment shown in FIGS. 11 and 12;

FIG. 14 is an exploded perspective view of an additional embodiment of the invention;

FIG. 15 is a fragmentary sectional view of the embodiment shown in FIG. 14;

FIG. 16 is an end view of an embodiment employing an increased number of magnetic phases relative to the number of magnetic phases in any of the previous embodiments; and FIG. 17 is a fragmentary schematic view illustrating an axial disposition of different poles in the embodiment of FIG. 16.

Figure 1:
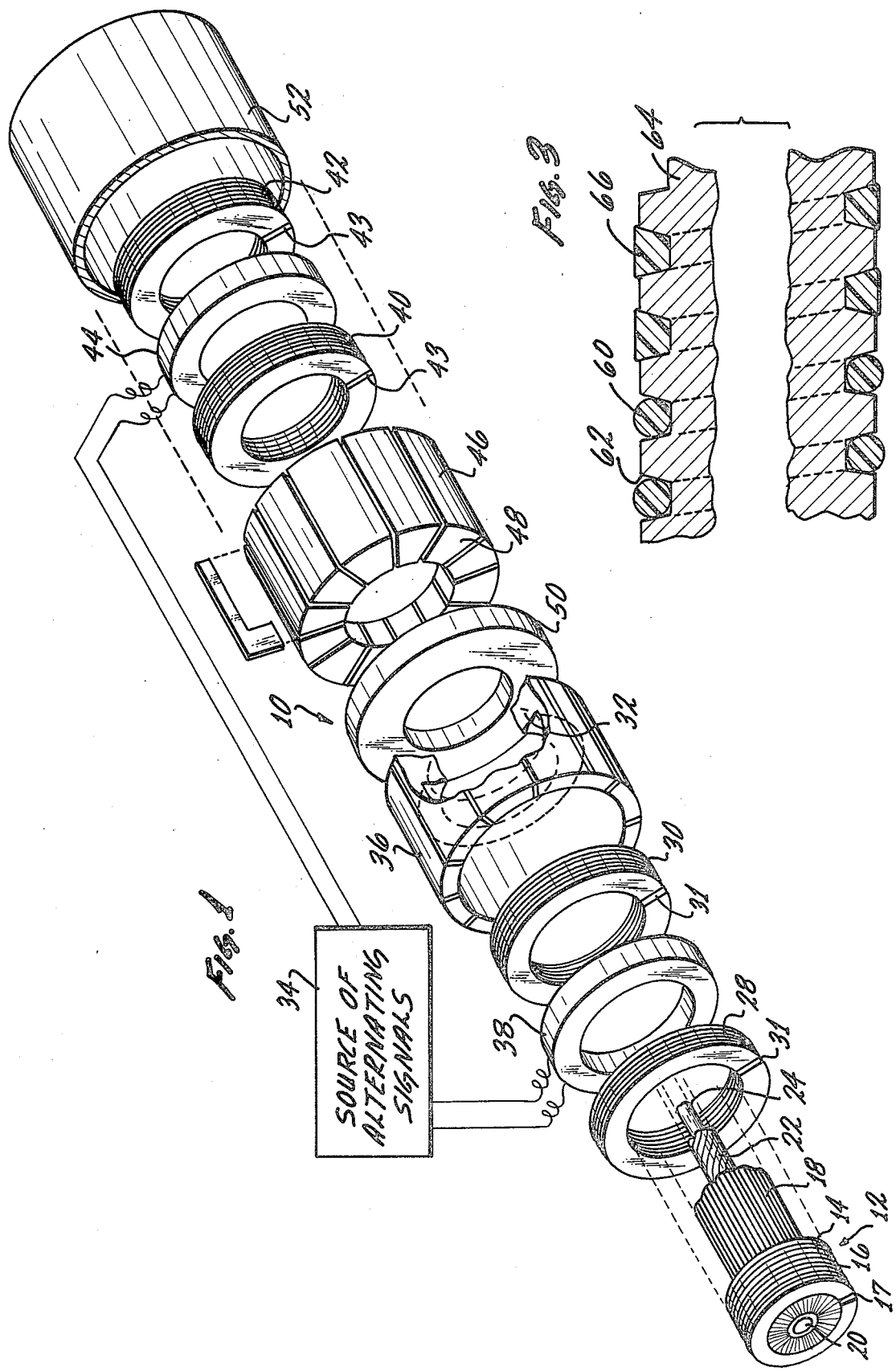
FIG. 1 is an exploded perspective view of one embodiment of a single axis linear motor constituting this invention.

In one embodiment of the invention, a linear motor (FIGS. 1 and 2) is provided for moving a movable member such as a head generally indicated at 10 along a single axis relative to a stationary member such as a platen generally indicated at 12. The head 10 and the platen 12 are preferably provided with cylindrical configurations.

The stator 12 may be formed from a plurality of ring-shaped laminations. Alternate laminations 14 may be made from a suitable magnetizabel material such as a soft iron. The other laminations 16 may be made from a suitable nonmagnetic material such as brass or may be made from a stainless steel. As an alternate configuration, the laminations may be made from a magnetizable iron which may be the same material as that of the laminations 14. However, the outer radial dimension of the laminations 16 may be less than that of the laminations 14. The resultant recesses produced at the outer radial ends of the laminations 16 may be filled with an epoxy or any other suitable material.

By way of illustration, the laminations 14 and 16 (FIGS. 1 and 2) may be provided with a thickness in the order of twenty-five thousands of an inch (0.025"). The laminations 14 and 16 may be provided with a suitable external diameter such as one inch (1") and a suitable internal diameter such as five-eights inches (⅝"). The laminations 14 and 16 may be cut axially to provide a very slight gap 17 so as to prevent the laminations from functioning as a single-turn winding. Such a single-turn winding would otherwise have such a low impedance that it might function as a short circuit and impair the proper operation of the motor. The gaps 17 in the different laminations may be staggered angularly. Biasing means such as a spring 22 may be wound spirally in the aperture 20 to pre-load the strips 18 radially outwardly against the inner periphery of the laminations 14 and 16. The spring 22 may be disposed on a shaft 24 made from a suitable nonmagnetic material.

The head 10 may include two assemblies each of which may be constructed in a similar manner. One assembly includes a first pole formed from a plurality of magnetizable laminations 28 and a second pole formed from a plurality of magnetizable laminations 30. The laminations 28 and 30 are hollow and ring shaped and are preferably made from a soft iron. The laminations 28 and 30 may be provided with a suitable thickness corresponding to the thickness of the laminations 14 and 16. Alternate ones of the laminations 28 and 30 may be shortened so that they are displaced further from the laminations 14 and 16 than the other ones of the laminations 28 and 30. In this way teeth are defined at the inner surface of the laminations 28 and 30 at positions adjacent to the laminations 14 and 16. The laminations 28 and 30 may be provided with slight gaps 31 corresponding to the gaps 17 in the laminations 14 and 16.

The laminations 28 are spaced by a particular offset from the laminations 30. For example, when the thickness of the laminations 14 and 16 is twenty-five thousands of an inch (0.025"), the offset of the laminations 30 relative to the laminations 28 may be twenty-five thousands of an inch (0.025"). This causes the projecting laminations 28 to be disposed adjacent the magnetic laminations 14 at the same time that the projecting laminations 30 are disposed adjacent the non-magnetic laminations 16 and vice versa. In this way, the mechanical phase of the laminations 30 is displaced by a suitable angle such as one hundred and eighty degrees (180°) from the phase of the laminations 28.

A winding 38 is disposed between the poles formed by the laminations 28 and 30. The winding 32 may be formed from one or more turns of wire disposed in cylindrically enveloping relationship to the laminations 14 and 16 without being mechanically or electrically connected to these laminations. The winding 32 is connected to a source 34 of alternating signals.

The laminations 28, the winding 32 and the laminations 30 are disposed in a sleeve 36. The sleeve 36 is formed from a plurality of strips made from a suitable magnetizable material such as soft iron. Each of the strips is disposed radially and extended axially. At the end adjacent the laminations 30, the strips in the sleeve 36 are provided with a leg 32 extending radially inwardly.

The second assembly includes a first pole defined by magnetizable laminations 40 and a second pole defined by magnetizable laminations 42 respectively corresponding to the laminations 28 and 30. The laminations 40 and 42 are provided with gaps 43 corresponding to the gaps 31 in the laminations 28 and 30. The laminations 40 and 42 are also mechanically offset in phase from each other by a suitable angle such as one hundred and eighty degrees (180°). However, the laminations 40 and 42 are mechanically offset by a suitable angle such as ninety degrees (90°) from the laminations 28 and 32. The angle corresponds to one half of the thickness of the laminations 14 and 16.

A winding 44 corresponding to the winding 32 is disposed between the laminations 40 and 42. The winding 44 is connected to the source 34 to receive signals electrically displaced by a suitable angle such as ninety degrees (90°) from the phase of the signals introduced to the winding 32. The electrical phase displacement between the signals introduced to the windings 32 and 44 corresponds to the mechanical phase offset or displacement of the laminations 40 and 42 relative to the laminations 28 and 30. Although the signals introduced to the windings 32 and 44 are preferably sinusoidal, it will be appreciated that the signals may have other wave shapes without departing from the scope of the invention.

The laminations 40 and 42 and the winding 44 are disposed in a sleeve 46 corresponding to the sleeve 36. The sleeve 46 is formed from laminations with legs 48 corresponding to the legs 38. However, the legs 48 are disposed at the opposite end of the sleeve 46 relative to the disposition of the legs 38 on the sleeve 36.

A permanent magnet 50 is disposed between the sleeves 36 and 46. The permanent magnet 50 may be provided with a ring-shaped configuration having a diameter and radial dimension corresponding substantially to the diameter and radial dimension of the sleeves 36 and 46. The sleeves 36 and 46 and the permanent magnet 50 may be disposed within a housing or cage 52 made from a suitable nonmagnetic material. The cage 52 helps to position the radial strips in the sleeves 36 and 46.

Figure 2:
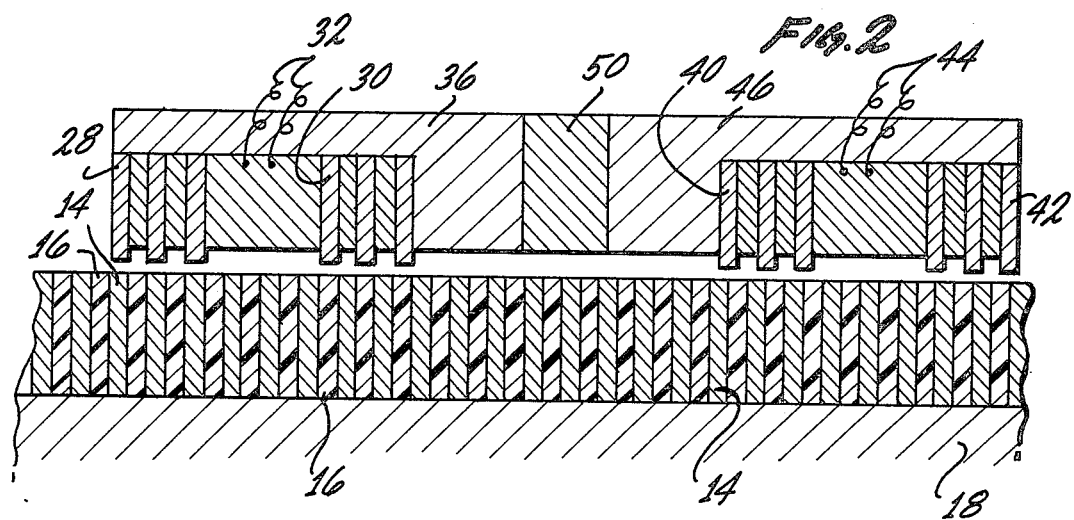
FIG. 2 is a sectional view of the linear motor shown in FIG. 1.

The alternating signals introduced to the windings 32 and 44 control the displacement of the head 10 relative to the stator 12. For example, in the position of the head relative to the stator as shown in FIG. 2, magnetizable teeth in the laminations 28 are disposed directly above the magnetizable laminations 14, and magnetizable teeth in the laminations 30 are disposed directly above the nonmagnetic laminations 16. Since the magnetizable teeth in the laminations 28 are disposed directly above the magnetizable laminations 14, any change in the flux passing radially through the laminations 28 as a result of a flow of current through the winding 32 will not produce any displacement of the head 10 relative to the stator 12.

In the position shown in FIG. 2, the magnetizable teeth in the laminations 40 are disposed partially above the magnetizable teeth in the laminations 14 and partially above the nonmagnetic laminations 16. This is also true of the laminations 42. As a result, a flow of current through the winding 44 will cause a force to be produced for displacing the head 10 relative to the stator 12. This force is in a direction for moving the head 10 so that either the magnetizable teeth in the laminations 40 or the magnetizable teeth in the laminations 42 will become disposed directly above the laminations 14. This force occurs in a direction which tends to minimize the magnetic reluctance between the magnetizable laminations in the head and the magnetizable laminations in the stator (for the closed magnetic circuit including the permanent magnet). This force is a function of the polarity and magnitude of the current flowing in the winding 44.

The displacement of the head 10 relative to the stator 12 results from an interaction of the magnetic flux produced by the permanent magnet 50 and the magnetic flux produced by the flow of current through the winding 44. For example, the flux produced by the permanent magnet 50 has a magnetic path including the permanent magnet 50, the strips in the sleeve 46, the laminations 40 and 42, the laminations 14 and the strips 18. The passage of the magnetic flux is in an axial and radial direction in the strips defining the sleeve 46, a radial direction in the laminations 40 and 42, a radial direction in the laminations 14 and an axial direction in the strips 18. In this way, the passage of the magnetic flux is in a closed loop.

When current flows through the winding 44, it produces magnetic flux which is in the same direction in one set of the laminations 40 or the laminations 42 as the flux produced in this set of laminations by the permanent magnet 50. However, the flux produced by the winding 44 in the other set of laminations 40 and 42 in in an opposite direction to the flux produced in that set of laminations by the permanent magnet 50. For example, when the current in the winding 44 is in a direction to reinforce the flux produced in the laminations 40 by the permanent magnet 50, the flux produced in the laminations 42 opposes the flux produced in the laminations by the permanent magnet 50. Since the resultant flux in the laminations 42, a resultant force is produced in the head 10 for moving the head toward the left in FIG. 2 relative to the platen. This is the case when the phase of the signals introduced by the winding 44 leads by 90° the phase of the signals produced by the winding 32 in the position shown in FIG. 2 of the head 10 relative to the stator 12 and the sequence of the sine and cosine signals defines a vector rotating counterclockwise.

When the sequence of the sine and cosine signals defines a vector rotating clockwise, the flux produced in in the laminations 42 by the current in the winding 44 as exemplified in the particular position shown in FIG. 2 reinforces the flux produced in these laminations by the permanent magnet 50. However, the flux produced in the laminations 40 by the currents in the winding 44 opposes the flux produced in these laminations by the permanent magnet 50. A force is accordingly produced on the head 10 in a direction for moving the head toward the right in FIG. 2 when the sequence of the sine and cosine signals defines a vector rotating clockwise.

Upon the movement of the laminations 40 or 42 into alignment with the laminations of the stator, the laminations 28 and 30 are displaced from the laminations 14. This causes a force to be produced between the laminations 28 or 30 and the laminations 14 in a direction for minimizing the magnetic reluctance when a signal is applied to the winding 32.

Actually, since the signals introduced to the windings 32 and 44 are alternating and have a 90° phase displacement relative to each other, progressive and phase-related variations in forces are produced relative to the stator 12 by the appropriate magnetic assemblies on the head 10. Such progressive and phase-related variations in force are produced on the basis that the signals introduced to the windings 32 and 44 are periodic and have the same peak amplitudes. These forces vary progressively in a direction for moving the head progressively relative to the stator so that the movement of the head follows an angular displacement of a rotating vector. The movement of the head relative to the stator 12 corresponds precisely to the relative phase and angular displacement of the signals in the windings 32 and 44. In this way, the arrangement shown in FIGS. 1 and 2 constitutes a synchronous motor. The synchronous motor may be considered as a linear motor because the movement of the head 10 relative to the stator 12 occurs along a particular linear axis.

The synchronous motor shown in FIGS. 1 and 2 and described above has certain advantages over the linear motors of the prior art. For example, since the head 10 envelops the stator 12 in a symmetrical arrangement which is preferably cylindrical, any noise from rapid accelerations of the head relative to the stator is contained within the head. In effect, the head serves as a noise shield for preventing any such noise from being propagated into the atmosphere. Furthermore, the symmetry of the head relative to the stator causes the head to be balanced relative to the stator. This balanced relationship results from the fact that substantially all the forces on the head are radial so that the forces at diametrically opposite positions tend to become cancelled. In this way, the forces on the head relative to the stator are minimal in directions other than the axial direction produced by the forces for moving the head along the single axis relative to the stator.

FIG. 3 illustrates a modification of the embodiment shown in FIG. 2. In this modification, the non-magnetic laminations may be formed by winding a non-magnetic wire 60 spirally in a spiral groove 62 formed in a magnetizable member 64. The winding 60 may then be flattened into the groove and machined so that the winding will be flush with the member 62. This is illustrated as at 66. Alternatively, bifilar windings may be wound around the member 64. One of these windings may be magnetizable and the other winding may be non-magnetizable. The bifilar windings may then be flattened and machined to provide a flush and contigous relationship.

When the laminations on the stator 12 are formed as shown in FIG. 3 and described above, the laminations on the head may have to be cocked or canted in the form of a helix with the same pitch as the pitch of the laminations on the stator. Alternatively, the laminations on the head can be formed in the same manner as described in the previous paragraph for the stator. This will automatically provide the laminations on the head with the required form and pitch.

Figure 4:
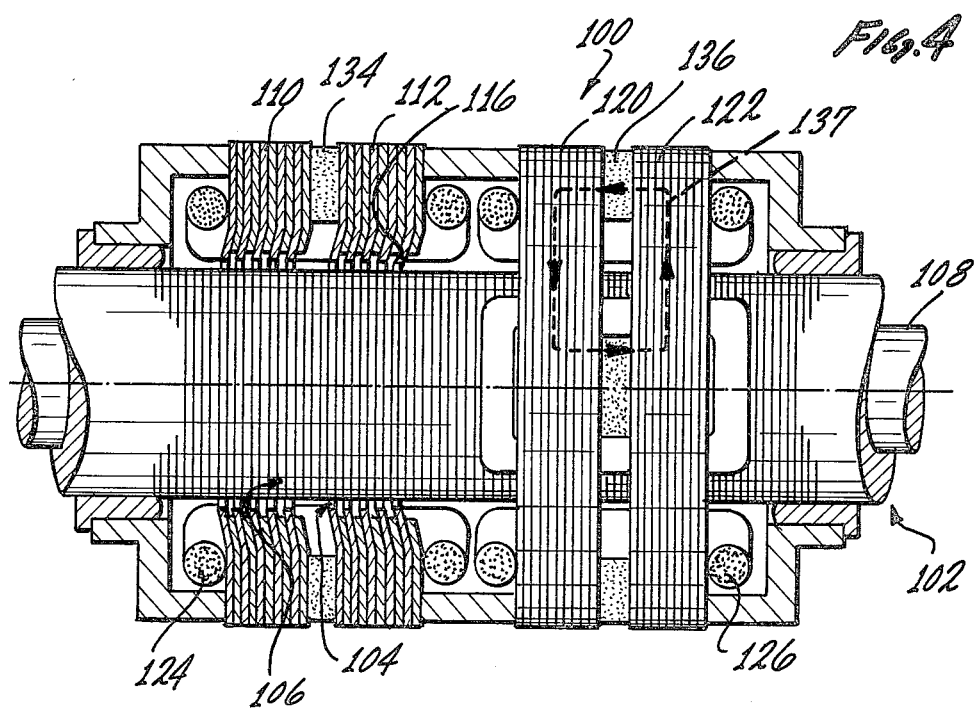
FIG. 4 is a sectional view of a second embodiment of the invention.

FIGS. 4 and 5 illustrate a second embodiment of the invention. The embodiment shown in FIGS. 4 and 5 also includes a head generally indicated at 100 and a stator generally indicated at 102. The stator includes a plurality of magnetizable laminations 104 and nonmagnetizable laminations 106 alternately disposed relative to one another. The laminations 104 and 106 are hollow and ring-shaped to receive a hollow shaft 108 made from a suitable magnetizable material such as soft iron.

The head 100 includes two substantially identical assemblies. One assembly is formed by ring-shaped laminations 110 and 112, each of which is provided with a plurality of poles angularly displaced from one another around the angular periphery of the laminations. Alternate poles 114 in the first laminations 100 are bent in a first direction through an axial distance of 90° and the other poles 116 in the laminations are bent in a second direction through an angle of 90°. This causes the poles 116 in the laminations 110 to be displaced axially by a distance of 180° (corresponding to the thickness of the laminations) from the poles 114. The first laminations 110 are alternated with the second laminations 112 in which the poles are shortened.

In this way, the lengthened poles in the laminations are effectively coupled magnetically to the stator 102 but the shortened poles in the laminations are not effectively coupled magnetically to the stator because of their shortened length. As will be appreciated, laminations made from a non-magnetic material may be substituted for the magnetic laminations 110 with shortened poles.

The second assembly includes laminations 120 and 122. The laminations 120 and 122 are also formed in a manner similar to that described above for the laminations 110 and 112 but the poles of the laminations 120 are respectively offset mechanically by displacements of 90° and 270° relative to the poles 114 and 116 of the laminations 110.

Windings 124 and 126 are wound in a manner to be magnetically coupled respectively to the poles 114 and 116, laminations 110 and to the poles of the laminations 120. Permanent magnets 134 and 136 may be respectively disposed to produce flux of opposite polarities in the laminations 110 and flux of opposite polarities in the poles of the laminations 120.

The linear motor shown in FIGS. 4 and 5 and described above operates in a manner similar to the embodiment shown in FIGS. 1 and 2. For example, the flux flows radially through the laminations in the head and the laminations in the stator and axially through the shaft 108. This is illustrated by a closed loop 137 shown in broken lines in FIG. 4. Furthermore, the permanent magnet 134 produces flux of one polarity in the poles 114 formed by the laminations 110 and flux of the opposite polarity in the poles 116 formed by the laminations 110. However, when a current flows through the winding 124, the current reinforces, in one set of poles (such as the poles 114), the flux from the permanent magnet 134 and opposes, in the other set of poles (such as the poles 116), the flux from the permanent magnet. In this way, forces are produced between the head 100 and the stator 102 in a direction for moving the head axially relative to the stator. The movement of the head 100 relative to the stator 102 is in a direction to minimize the magnetic reluctance between the head and the stator.

Instead of shortening the poles on the laminations 112 and 122 and bending the poles on the laminations 110 and 120 as in the embodiment of FIGS. 4 and 5, the same result may be accomplished in another manner. For example, a first pair of alternately disposed poles in alternate laminations may be lengthened and the other pair of alternately disposed poles in these laminations may be shortened. In the other laminations, the first pair of alternately disposed poles are shortened and the second pair of alternately disposed poles are lengthened. The poles of the laminations do not have to be bent as in the embodiment shown in FIGS. 4 and 5. However, in such modification, the flux would have the same path as in the embodiment of FIGS. 4 and 5.

FIGS. 6, 7 and 8 illustrate an embodiment in which the flux is entirely in a radial direction without any axial components in a head generally indicated at 150 and a stator generally indicated at 152. In the embodiment shown in FIGS. 6, 7 and 8, a plurality of laminations are disposed in each of a plurality of closed loops. For example, laminations 160, 162, 164 and 166 are disposed in a closed loop to define one assembly. Each of the laminations has a pair of poles at opposite ends of the lamination. For example, the laminations 160 have poles 168 and 170; the laminations 162 have poles 172 and 174; the laminations 164 have poles 176 and 178; and the laminations 166 have poles 180 and 182.

In first alternate ones of the laminations, the poles 168, 172, 176 and 180 are lengthened and the poles 170, 174, 178 and 182 are shortened. In the other alternate laminations, the poles 168, 172, 176 and 180 are shortened and the poles 170, 174, 178 and 182 are lengthened. The lengthened poles have a magnetic coupling with the stator but the shortened poles do not have a magnetic coupling with the stator.

Permanent magnets or electromagnets are disposed between successive pairs of laminations. For example, permanent magnets 184, 186, 188 and 190 may be respectively disposed between the laminations 160 and 162, the laminations 162 and 164, the laminations 164 and 166 and the laminations 166 and 168. A winding 190 may be disposed in the pocket defined by the poles 168 and 170 in the laminations 160. Similar windings 192, 194 and 196 may be respectively provided in the pockets in the laminations 162, 164 and 166. The windings 190, 192, 194 and 196 receive a signal of a first phase.

The laminations 160, 162, 164 and 166 and the associated permanent magnets and windings constitute a first assembly. A second assembly is provided in a manner similar to that described above for the first assembly. The second assembly is displaced axially from the first assembly. The poles of the laminations in the second assembly are mechanically offset by angles of 90° and 270° from the poles of the laminations in the first assembly. Windings are respectively associated with the laminations in the second assembly. Windings receive signals electrically displaced by 90° in phase from the signals introduced to the windings 190, 192, 194 and 196.

The linear motor shown in FIGS. 6, 7 and 8 and described above operates in a manner similar to the embodiment shown in FIGS. 1 and 2 except that the magnetic flux does not have axial component. For example, the permanent magnets 184, 186, 188 and 190 produce flux of the same polarity in the poles 168, 172, 176 and 180 formed by the laminations. The permanent magnets produce flux of the opposite polarity in the poles 170, 174, 178 and 182 formed by the laminations. This flux is in a closed loop having primarily radial and annular, but not axial, directions.

When a current flows through the windings 190, 192, 194 and 196, the current reinforces in the poles from one set of laminations the flux from the permanent magnets and opposes in the poles from the other set of laminations the flux from the permanent magnets. For example, the current may be in a direction to reinforce the flux in the poles of one of the laminations 160 and 164 and to oppose the flux in one of the poles of the laminations 162 and 166. In this way, forces are produced between the head and the stator in a direction for moving the head axially relative to the stator. The movement of the head 100 relative to the stator is in a direction to minimize the magnetic reluctance between the head and the stator.

Instead of alternately shortening the poles as described above, the laminations in the embodiment of FIGS. 6, 7 and 8 may be provided with bent poles in a manner similar to that shown in FIGS. 4 and 5. In this alternative arrangement, first poles on alternate ones of the laminations may be bent axially in a first direction through an angle of 90°. The other poles on these alternate laminations may be bent axially in an opposite direction through an angle of 90°. In the other laminations, the poles are shortened.

The stator in the embodiment shown in FIGS. 6, 7 and 8 and in the embodiment described in the previous paragraph may be constructed as shown in FIG. 3. The stator may also be constructed as shown in FIG. 9. As shown in FIG. 9, the stator may be in the form of a grooved thin hollow tube 200. The outer surface of the tube 200 may be provided with teeth 202 spaced by a distance corresponding to the thickness of the laminations in the head. Thin washers 204 may be disposed within the tube 200 to provide a return path to the laminations in the head of the magnetic flux passing to the stator from the head.

The stator may be further constructed as shown in FIG. 10. In this embodiment, the stator may be in the form of a hollow tube 206. The tube 206 may be provided with teeth 208 corresponding to the teeth 202.

FIGS. 11, 12 and 13 illustrate a third embodiment of the invention. In the embodiment shown in FIGS. 11, 12 and 13, laminations 210, 212, 214 and 216 are provided on a head generally indicated at 218. Each of the laminations may have two poles defined by a window between the poles. For example, the lamination 210 may have poles 220 and 222 defined by a window 224.

The laminations 210, 212, 214 and 216 may be disposed in angularly spaced relationship to define a ring which envelops the stator. Specifically, one of the poles in alternate ones of the laminations 210 and 214 is bent in one axial direction and the other pole in these laminations is bent in the opposite direction. For example, the poles 220 are bent in one axial direction in alternate ones of the laminations 214 and the poles 222 are bent in the other axial direction of these laminations. The poles in these alternate laminations are lengthened to provide a magnetic coupling with the stator. Spacers 224 may be disposed between adjacent pairs of the laminations 210 and between adjacent pairs of the laminations 214. Alternatively, bent poles with shortened lengths may be disposed between the laminations with the lengthened poles.

The laminations 212 and 216 are constructed and disposed relative to one another in a manner similar to the laminations 210 and 214. However, the laminations 212 and 216 are displaced axially by an angle of 90°, corresponding to one half (½) of the thickness of the laminations, from the laminations 210 and 214. Spacers 226 may be disposed between adjacent pairs of the laminations 212 and between adjacent pairs of the laminations 216 or laminations with poles of shortened lengths may be provided at these positions.

Permanent magnets 230, 232, 234 and 236 or electromagnets are disposed in angularly spaced relationship between adjacent pairs of laminations. The poles of the magnets are disposed so that the opposite ends of a lamination are polarized in the same direction. For example, the magnets 230 and 236 are disposed so that the poles 220 and 222 of the lamination 210 are polarized by north poles of the magnets.

Windings 240, 242, 244 and 246 are respectively associated with the laminations 210, 212, 214 and 216. Each of the windings is formed so that the turns are disposed at one end in the cavity such as the window 224 in the lamination 210 and are disposed at the opposite end at a position external to the lamination. The windings 240 and 244 receive alternating signals of a first electrical phase and the windings 242 and 246 receive alternating signals of a second electrical phase displaced by an angle of ninety degrees (90°) from the first phase.

The embodiment shown in FIGS. 11, 12 and 13 operates in a manner similar to that described above. When current flows through the windings, a flux is produced for reinforcing, at one pole face in a lamination, the flux from the associated permanent magnet and for opposing, at the other pole in the lamination, the flux from the permanent magnet. For example, the flux produced by the flow of current through the coil 240 may reinforce in the pole 222 the flux from the permanent magnet 230 and may oppose in the pole 220 the flux from the permanent magnet 236. This causes a force to be produced at the pole 222 to move the head axially relative to the stator in a direction for minimizing the magnetic reluctance between the head and the stator. A similar force is simultaneously produced at the pole of the lamination 214 diametrically opposite the pole 222 in the lamination 210. As the phase of the signals on the windings 240 and 244 and the phase of the signals on the windings 242 and 246 progress, the head is moved progressively relative to the stator in accordance with the phase progression of the signals.

FIGS. 14 and 15 illustrate another embodiment which operates in substantially the same manner as the embodiment shown in FIGS. 11 and 12. In the embodiment shown in FIGS. 14 and 15, laminations are disposed in the same annular disposition as in the embodiment of FIGS. 11 and 12. However, none of the poles in the laminations in FIGS. 14 and 15 is bent and no spacer laminations are needed.

In each of the laminations in the embodiment of FIGS. 14 and 15, one of the poles is shortened so that there is effectively no magnetic coupling between these poles and the stator. In laminations alternately spaced in the axial direction, one of the poles is shortened. In the other laminations alternately spaced in the axial direction, the other pole is shortened. For example, a pole 280 in alternate ones of laminations 282 is shortened and an oppositely disposed pole 284 is shortened in the other ones of the laminations 282.

The motor shown in the embodiment of FIGS. 11, 12 and 13 or in the embodiment of FIGS. 14 and 15 and described above has certain important advantages even when compared to the previous embodiments. As will be seen, the linear motor is provided with a minimal number of parts, particularly since the poles for the two quadrature phases are disposed in a single annulus. The balance between the head and the stator is also optimal and the noise is minimal because the two quadrature phases are provided in a single ring enveloping the stator.

It will be appreciated that the linear motions of this invention may be provided with a number of phases equal to two (2), or greater than two (2). It will also be appreciated that electromagnets may be employed in place of permanent magnets. A suitable arrangement is shown in FIGS. 16 and 17 to illustrate an embodiment employing electromagnets and employing three phases separated from one another by 120°.

The poles in the electromagnet shown in FIGS. 16 and 17 may be formed as by axial bending. The axial bending of the different poles is provided so that the poles will be offset axially by an axial distance having an angular equivalent as shown in FIGS. 16 and 17. For example, twelve (12) separate poles 300, 302, 304, 306, 308, 310, 312, 314, 316, 318, 320 and 322 may be provided. These poles may be provided with axial positionings of angles of 0°, 180°, 120°, 300°, 240°, 60°, 0°, 180°, 120°, 300°, 240° and 60°. For reference purposes, an angle of 60° corresponds to a distance equal to one third of the thickness of the laminations.

When the poles are bent, alternate poles may be shortened in a manner described above. Alternatively, alternate ones of the laminations may be non-magnetic.

Windings may be provided for association magnetically with the different poles. The windings may have relative phases electrically of 0°, 120° and 240° to correspond to the phase displacements of the different poles. The windings are illustrated at 340, 342, 344, 346, 348 and 350. The windings 340 and 346 produce signals for energizing the poles 300 and 312 with a first phase indicated at 0° in FIG. 16 and the poles 302 and 314 with an opposite phase indicated at 180° in FIG. 16; the windings 342 and 348 energize the poles 304 and 316 with a phase indicated at 316 in FIG. 16 and the poles 306 and 318 with a phase indicated at 300° in FIG. 16; and the windings 344 and 350 energize the poles 308 and 320 with a phase indicated at 240° in FIG. 16 and the poles 310 and 322 with a phase illustrated at 60° in FIG. 16.

As will be seen, the poles associated with each winding are either in phase or 180° out of phase. This causes the motor shown in FIG. 16 to operate in a manner described above for the other embodiments. For example, when magnetic flux is produced by the windings 340 and 346, the magnetic flux will aid the flux from electromagnetic polarization of one pair of poles such as the poles 300 and 312 and will oppose the flux produced by electromagnetic polarization of the other pair of poles such as the the poles 310 and 320. The magnetic polarization is produced by energizing windings such as a winding 360 between the windings 342 and 344. Alternatively, the polarization may be provided by permanent magnets. The magnetic polarization described above will cause the head to move relative to the stator to align the poles 300 and 312 with magnetizable laminations in the stator.

It will also be appreciated that the head may be disposed within a hollow stator. In other words, the construction shown in the drawings as being external on the stator will be internal when the head is disposed within the stator. The features of the head (shown in the drawings as defining a hollow annulus) will then be external so that the head will be disposed in magnetically coupled relationship to the stator.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination in a linear motor, a stator disposed axially to provide for magnetizable properties in alternate laminations and nonmagnetizable properties in the other laminations and to provide for a flow of magnetic flux through the stator, and
a head disposed annularly relative to the stator and in magnetically coupled relationship to the stator and movable axially along the stator, the head including magnet means providing a magnetic flux and further including first and second assemblies,
each assembly including:
at least one winding disposed to produce magnetic flux having a radial component,
first and second magnetizable portions disposed in axially spaced relationship to each other and in magnetizable relationship to the stator and responsive to the magnetic flux produced by the winding and the magnetic flux from the magnet means for reinforcing, in one of the first and second magnetizable portions, the magnetic flux from the magnet means with the magnetic flux provided by the winding and for opposing, in the other one of the first and second magnetizable portions, the magnetic flux from the magnet means with the magnetic flux provided by the winding,
the first and second magnetizable portions in each assembly being disposed in a first phase relationship to each other and in a second phase relationship to the first and second magnetizable portions in the other assembly.

2. The combination set forth in claim 1, including,
means for introducing an alternating signal to the winding in a first one of the assemblies and means for introducing to the winding in the other assembly an alternating signal of the second phase relationship relative to the signal introduced to the winding in the first assembly.

3. The combination set forth in claim 1, wherein the stator is formed from magnetizable and non-magnetizable laminations and the magnetizable laminations are formed from a first material and the non-magnetizable laminations are formed from a second material different from the first material.

4. The combination recited in claim 1, wherein the magnetizable portions in each assembly are axially offset from each other and axially offset from the magnetizable portions in the other assembly.

5. The combination recited in claim 4, wherein the magnetizable portions in each assembly are also axially offset from each other and axially offset from the magnetizable portions in the other assembly.

6. The combination recited in claim 5, wherein the first and second magnetizable portions in each of the first and second assemblies are disposed relative to one another to provide for the production in the stator of magnetic flux having an axial component.

7. The combination recited in claim 5, wherein the first and second magnetizable portions in each of the first and second assemblies are disposed relative to one another to provide for the production in the stator of magnetic flux having a radial component without an axial component.

8. In combination in a linear motor,
stators alternately defining in an axial direction laminations with magnetizable properties and laminations with non-magnetizable properties, the magnetizable laminations providing for a passage of flux along the laminations;
a first plurality of magnetizable portions magnetically coupled to the magnetizable laminations in the stator;
a second plurality of magnetizable portions magnetically coupled to the laminations in the stator, the magnetizable portions in the second plurality being axially offset by a first particular phase from the magnetizable portions in the first plurality;
magnet means disposed relative to the magnetizable portions in the first and second pluralities to produce magnetic flux in a first radial direction in these magnetizable portions and in the magnetizable laminations in the stator,
first means disposed relative to the magnetizable portions in the first and second pluralities and energizable to produce magnetic flux in the first direction in the magnetizable portions in the first plurality and to produce magnetic flux in a second direction opposite to the first direction in the magnetizable portions in the second plurality,
a third plurality of magnetizable portions magnetically coupled to the laminations in the stator;
a fourth plurality of magnetizable portions magnetically coupled to the laminations in the stator, the magnetizable portions in the fourth plurality being offset by the first particular phase from the magnetizable portions in the third plurality and being offset by a second particular phase from the magnetizable portions in the first and second pluralities, and
the magnet means being disposed relative to the magnetizable portions in the third and fourth pluralities to produce magnetic flux in the first radial direction in these laminations, and
second means disposed relative to the magnetizable portions in the third and fourth pluralities and energizable to produce magnetic flux in the first radial direction in the magnetizable portions in the third plurality and to produce magnetic flux in a second radial direction opposite to the first radial direction in the magnetizable portions in the fourth plurality.

9. The combination set forth in claim 8, including,
the first means receiving first alternating signals and the second means receiving second alternating signals displaced electrically by the second phase from the first alternating signals.

10. The combination set forth in claim 8, including,
the first means being disposed between the magnetizable portions in the first and second pluralities and the second means being disposed between the magnetizable portions in the third and fourth pluralities.

11. The combination set forth in claim 9, including,
the magnetizable portions in the first, second, third and fourth pluralities being hollow ring-shaped laminations and the first means being disposed in magnetically coupled relationship to the magnetizable portions in the first and second pluralities and the magnet means being disposed in magnetically coupled relationship to the laminations in the first and second pluralities and between the laminations in the third and fourth pluralities and the second means being disposed between the laminations in the third and fourth pluralities.

12. The combination set forth in claim 11, including, first magnetizable means enveloping the magnetizable portions in the first and second pluralities and the first means, and second magnetizable means enveloping the magnetizable portions in the third and fourth pluralities and the second means.

13. The combination set forth in claim 11, wherein the stator includes magnetizable strips disposed radially within the magnetizable laminations in the stator and extending axially between the magnetizable portions in the first and second pluralities and the magnetizable portions in the third and fourth pluralities.

14. The combination set forth in claim 8, including, each of the magnetizable portions in the first, second, third, and fourth pluralities being provided with poles spaced angularly around the periphery of the magnetizable laminations in the stator and each of the first and second means being formed from windings displaced angularly around the periphery of the magnetizable laminations in the stator.

15. The combinations set forth in claim 9, wherein each of the magnetizable portions in the first, second, third and fourth pluralities is provided with poles angularly spaced around the periphery of the magnetizable laminations in the stator and in magnetically coupled relationship to the magnetizable laminations in the stator and each of the first and second means is formed from windings displaced angularly around the periphery of the laminations in the stator and magnetically coupled to particular ones of the magnetizable portions in the first, second, third and fourth pluralities.

16. The combination set forth in claim 15, wherein alternate poles in each of the magnetizable portions in the first, second, third and fourth and fifth pluralities are shortened and the poles in the magnetizable portions in the first, second, third, fourth and fifth pluralities are bent by a particular distance in a first direction.

17. The combination set forth in claim 15, wherein the magnetizable portions in the first, second, third, and fourth pluralities are laminations disposed in a single annulus and the magnetizable portions in each of the first, second, third and fourth pluralities are angularly displaced from the magnetizable portions in the other pluralities.

18. The combination set forth in claim 15, wherein the magnetizable portions in each of the first and second pluralities are disposed in a first annulus and the magnetizable portions in each of the first and second pluralities are angularly offset with respect to the magnetizable portions in the other one of the first and second pluralities and the magnetizable portions in each of the third and fourth pluralities are angularly offset with respect to the magnetizable portions in the other one of the third and fourth pluralities and are axially offset from the magnetizable portions in the first and second pluralities and are disposed in a second annulus.

19. The combination set forth in claim 18, wherein the magnetizable portions in each of the first, second, third and fourth pluralities define magnetic poles at their ends and the magnetic poles defined by the magnetizable portions in the first and second pluralities are axially offset by an angle of 180° from each other and are respectively offset axially by angles of 90° and 270° from the magnetizable portions in the third and fourth pluralities.

20. In combination in a linear motor,
a stator defining a first plurality of ring-shaped laminations, alternate ones of the laminations being magnetizable and other ones of the laminations being non-magnetizable,
magnetizable means disposed within the laminations in the first plurality for directing magnetic flux axially,
a second plurality of ring-shaped laminations enveloping the laminations in the first plurality in magnetically coupled relationship to such laminations,
a third plurality of ring-shaped laminations enveloping the laminations in the first plurality in magnetically coupled relationship to such laminations,
a fourth plurality of ring-shaped laminations enveloping the laminations in the first plurality in magnetically coupled relationship to such laminations,
a fifth plurality of ring-shaped laminations enveloping the laminations in the first plurality in magnetically coupled relationship to such laminations,
a first ring-shaped winding disposed between the laminations in the second and third pluralities,
a second ring-shaped winding disposed between the laminations in the fourth and fifth pluralities, and
a permanent magnet disposed between the laminations in the second and third pluralities and the laminations in the fourth and fifth pluralities,
the laminations in the second and third pluralities being mechanically offset by a first particular phase relative to each other and the laminations in the fourth and fifth pluralities being mechanically offset by the first particular phase relative to each other and by a second particular phase relative to the laminations in the second and third pluralities.

21. The combination set forth in claim 20, including, means for introducing alternating signals to the first winding, and
means for introducing to the second winding alternating signals displaced electrically by the second particular phase from the signals introduced to the first winding.

22. The combination set forth in claim 20, wherein a first magnetizable sleeve constructed to pass magnetic flux in an axial direction envelops the laminations in the second and third pluralities and the first winding and a second magnetizable sleeve constructed to pass magnetic flux in an axial direction envelops the laminations in the fourth and fifth pluralities and the second winding.

23. The combination set forth in claim 21, wherein the magnetizable means within the laminations in the first plurality constitute strips axially disposed within the laminations and wherein means are provided within the strips for biasing the strips toward the laminations.

24. In combination in a linear motor,
a stator defining a first plurality of laminations, alternate laminations being magnetizable and the other laminations being non-magnetizable,
magnetizable means disposed relative to the laminations for directing magnetic flux axially,
a second plurality of laminations provided with poles angularly spaced around the periphery of the laminations in the first plurality in magnetically coupled relationship to such laminations, a third plurality of laminations provided with poles angularly spaced around the periphery of the laminations in the first plurality in magnetically coupled relationship to such laminations, a fourth plurality of laminations provided with poles angularly spaced around the periphery of the laminations in the first plurality in magnetically coupled relationship to such laminations, a fifth plurality of laminations provided with poles angularly spaced around the periphery of the laminations in the first plurality in magnetically coupled relationship to such laminations, the laminations in the second and third pluralities being mechanically offset by a first phase relative to each other and the laminations in the fourth and fifth pluralities being mechanically offset by the first phase relative to each other and by a second phase relative to the laminations in the second and third pluralities, a first plurality of magnet means disposed between pairs of adjacent poles in the second and third pluralities of laminations, a second plurality of magnet means disposed between pairs of adjacent poles in the fourth and fifth pluralities of laminations, a first plurality of energizable means angularly disposed around the peripheries of the laminations in the second and third pluralities and magnetically coupled to the poles in such laminations to produce flux in such poles when energized, and a second plurality of energizable means angularly disposed around the peripheries of the laminations in the fourth and fifth pluralities and magnetically coupled to the poles in such laminations to produce flux in such poles when energized.

25. The combination set forth in claim 24, including, means for introducing alternating signals to the energizable means in the first plurality, and means for introducing to the energizable means in the second plurality alternating signals electrically displaced by the second phase from the alternating signals introduced to the energizable means in the first plurality.

26. The combination set forth in claim 24 wherein the laminations in each of the second, third, fourth and fifth pluralities are formed by shortening alternate poles in each lamination and mechanically offsetting the poles in a first direction through a distance corresponding to the second phase.

27. The combination set forth in claim 26 wherein the laminations in each of the second, third, fourth and fifth pluralities are formed by shortening first alternate poles in first alternate ones of the laminations and shortening the other alternate poles in the other alternate ones of the laminations.

28. The combination set forth in claim 1, wherein the magnetizable and non-magnetizable laminations in the first plurality are spirally wound with a particular pitch and the first and second magnetizable means in each assembly are disposed in substantially the particular pitch.

29. The combination set forth in claim 9, wherein the magnetizable and non-magnetizable laminations in the first plurality are spirally wound with a particular pitch and the laminations in the second, third, fourth and fifth pluralities are disposed in substantially the particular pitch.

30. In combination in a linear motor, a stator defining a plurality of thin laminations, alternate laminations having magnetizable properties and the other laminations having non-magnetizable properties, the laminations being disposed in axially stacked relationship, the magnetizable laminations providing for a passage of magnetic flux radially along the laminations;

at least first and second pluralities of magnetizable portions, the magnetizable portions in each plurality extending angularly in magnetically coupled relationship to the magnetizable laminations in the stator to provide for a radial passage of the magnetic flux, the magnetizable portions in the first plurality being provided with first and second poles mechanically offset axially from each other by a first phase, the magnetizable portions in the second plurality being provided with first and second poles mechanically offset from each other by the first phase and axially offset mechanically from the magnetizable portions in the first plurality by a second phase different from the first phase, magnet means for polarizing the first and second poles in the magnetizable portions of each of the first and second pluralities, and first and second energizable means respectively associated with the magnetizable portions in the first and second pluralities for respectively receiving signals electrically having the first and second phases and for producing fluxes in the poles in accordance with the phases of such signals.

31. The combination set forth in claim 30 wherein the poles in the magnetizable portions in the first and second pluralities are disposed in magnetically coupled relationship to the laminations in the first plurality and the magnetizable portions in each of the first and second pluralities have the first and second poles displaced axially by a phase of 180° relative to each other and by a phase of 90° relative to the poles in the magnetizable portions in the other plurality.

32. The combination set forth in claim 31, wherein the poles in the magnetizable portions in each of the first and second pluralities are bent through a particular distance in a particular direction.

33. The combination set forth in claim 31, wherein each of the poles in the magnetizable portions in each of the first and second pluralities is displaced angularly from the other pole in the magnetizable portions in that plurality and is also displaced angularly from the poles in the magnetizable portions in the other plurality.

34. The combination set forth in claim 30, wherein the first and second poles in the magnetizable portions in the first plurality are disposed at different positions on the same magnetizable portions and the first and second poles in the magnetizable portions in the second plurality are disposed at different positions in the same magnetizable portions.

35. The combination set forth in claim 30 wherein the first and second poles in the magnetizable portions in the first plurality are respectively provided in first and second laminations angularly displaced from one another in a first annulus and the first and second poles in the magnetizable portions in the second plurality are respectively provided in third and fourth laminations angularly displaced from one another and the magnetizable portions in the first plurality are displaced axially from the magnetizable portions in the second plurality.

36. The combination set forth in claim 30 wherein the first poles in the magnetizable portions in the first plurality are on first individual magnetizable laminations and the second poles in the magnetizable portions in the first plurality are on second individual magnetizable laminations different from the first individual magnetizable laminations and the first poles in the magnetizable laminations in the second plurality are on third individual magnetizable laminations and the second poles in the magnetizable laminations in the second plurality are on fourth individual magnetizable laminations different from the third individual magnetizable laminations and the flux produced in the magnetizable laminations have radial and annular components without axial components.

37. The combination set forth in claim 36 wherein the first, second, third and fourth individual magnetizable laminations are displaced angularly from one another and the poles on such laminations are mechanically offset axially.

* * * * *